Patented Oct. 14, 1941

2,258,675

UNITED STATES PATENT OFFICE 2,258,675

MINERAL WELDING FLUX AND METHOD

Willi M. Cohn, El Cerrito, Calif.

No Drawing. Continuation of application Serial No. 295,633, September 19, 1939. This application February 12, 1941, Serial No. 378,599

4 Claims. (Cl. 219—10)

My invention relates to a welding flux and more particularly to a welding flux having a high melting point ideally adapted for use in electrical welding methods and operations making use of an electric arc, where the welding metal is deposited from a rod or wire coil, or in a carbon arc. My invention is also particularly applicable to automatic welding. This application is a continuation of my prior application Serial No. 295,633, filed September 19, 1939.

In electrical arc welding it is customary to use various flux compositions which are supplied to the arc during or to the parts before the welding operation in varying amounts to protect the welding metal, to clean it, and to facilitate a proper bond between the welding metal and the work. Many different kinds of compounds have been heretofore used for this purpose. However, it is of great importance that the welding flux used shall be in perfect chemical equilibrium, and that it shall have a sufficiently high melting point to maintain itself in the heat of the arc.

Among the objects of my invention are to provide a new flux composition for electric welding which will have advantages not possessed by prior fluxes, and to provide a flux composition having a melting point substantially in excess of the melting point of the metal being welded.

I have found that the relatively rare volcanic mineral mullite, formerly available in small quantities only from the Isle of Mull, provides, when properly applied to a weld, a flux which will maintain itself during the welding and which has a sufficiently high melting point so that the flux remains stable during the entire heating procedure and which will solidify before the metal of the weld. The mullite may be used in the form of a finely ground powder and distributed over the weld before or as welding proceeds and, if used with an automatic welding device, may be automatically delivered in front of the arc.

Natural mullite is an individual chemical crystalline and anhydrous material, and assays approximately 72% by weight of alumina, 28% by weight of silica. Because of volcanic action the water of crystallization has been removed and the mullite is gas free. Therefore mullite differs, not only in melting point from any individual ingredient, but has its own composition of the formula $Al_6Si_2O_{13}$.

Due to the fact that natural mullite is at the present time impractical to obtain, I prefer to produce artificial mullite as follows: Raw materials should be selected from various sources high in aluminum silicate content, such as, for example the minerals sillimanite or kyanite. A supply of alumina in approximately pure form with which to supplement the initial supply of alumina, is added. This supplemental supply of alumina may be provided by the use of an aluminum oxide in a fused or crystallized condition. No objection is had to some silica content in the alumina. Irrespective of what raw materials are used, the aluminum silicate is mixed with sufficient aluminum oxide to bring the composition of the batch to the theoretical composition of mullite as given above. In order to insure a high percentage of crystalline mullite I may use in the batch a mineralizing agent such as, for example, a fluorine containing material, for instance, cryolite.

The ingredients are ground to pass a 12-mesh-screen, thoroughly mixed, water added and bricks pressed. After drying, the bricks are placed in an electrical furnace, such as one containing three arcs between graphite electrodes. The bricks are heated to a temperature preferably above the melting point of the batch such as, for instance, 3500° F, or until the ingredients of the batch combine and the mullite crystals form. The material is then removed from the electric furnace and allowed to cool. The product in this form is predominantly in the form of mullite crystals having entirely different physical and chemical properties from any of the raw materials of the batch.

Irrespective of the equipment and precise procedure employed in the above-mentioned processing operation, the factors of time and temperature should be such as to eliminate all physically and chemically bound water from the raw materials as well as gas, and thus enable the reaction between the ingredients to take place to form anhydrous mullite crystals. During this heating procedure the crystals present in the raw materials are destroyed by the melting and new crystals are formed of a new composition (mullite) in the final product. The material, after cooling, is then broken up and preferably ground to pass a 50-mesh screen, and in this form used as a flux in conjunction with a machine for automatic welding, or in hand welding.

I have found that mullite when remelted in the electric arc during welding, maintains a coating over the metal in the arc zone, thus protecting the metal from the atmosphere, later solidifying as slag while the metal is in semi-liquid condition.

The maintenance of the coating during welding is in part attributed to the high melting point (3320° F.) of the mullite which, as previously stated, is far above the melting point of the weld metal, if it is steel plate for example (2500° F.). Tests show that the melted mullite tends to retain considerable viscosity under the heat of the welding zone.

The melted mullite, of course, floats on top of the metal and as the arc progresses the mullite hardens as slag. As the mullite slag retains heat it causes good annealing of the weld. Since it has an entirely different coefficient of expansion than that of the weld metal, the slag readily breaks and peels from the cooled weld, thus leaving the weld free and clean.

The results obtained from the use of mullite, natural or artificial, as a flux, are entirely different in action from that of any of the raw materials singly or admixed, used in making the mullite, because no water of crystallization or gas is present in the mullite crystals. I have found that none of the raw materials, singly or mixed, such as a mixture of sand and clay, can be utilized as a satisfactory flux in the electric arc because of the release of water vapor and gas under the heat of the arc, such release causing a weld with holes and porosities. It is only through the heat treatment of the proper mixed ingredients, with conversion into a new material, viz., mullite with its own crystal formation, anhydrous and free from gas that the proper results can be obtained.

The behaviour of the mullite flux of my invention may of course be slightly modified if desired by the addition of other ingredients, which may be used to lower the melting point, to change the viscosity or wettability, to stabilize the arc, or for other purposes, but I do not wish to be limited in any manner to the inclusion of any such additional ingredients.

Also I wish to point out that my invention may be used as a coating for rod, wire coils or as a separate powdered material.

I claim:

1. An electric arc welding flux comprising a major portion of anhydrous crystalline mullite and substantially devoid of free silica.

2. An electric arc welding flux comprising a major portion of pulverized anhydrous crystalline mullite and substantially devoid of free silica.

3. The method of welding by the electric arc process which comprises maintaining an arc and blanketing the molten portions of the work during the welding operation with a flux principally comprising anhydrous crystalline mullite and substantially devoid of free silica.

4. The method of welding by the electric arc process which comprises maintaining an arc and blanketing the molten portions of the work during the welding operation with a flux principally comprising pulverized anhydrous crystalline mullite and substantially devoid of free silica.

WILLI M. COHN.